United States Patent
Maeda et al.

(10) Patent No.: US 12,220,824 B2
(45) Date of Patent: Feb. 11, 2025

(54) CORRECTION DEVICE, CORRECTION METHOD, AND ROBOT SYSTEM

(71) Applicant: Hitachi, Ltd., Tokyo (JP)

(72) Inventors: Masaaki Maeda, Tokyo (JP); Kaoru Kitajima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 195 days.

(21) Appl. No.: 18/116,097

(22) Filed: Mar. 1, 2023

(65) Prior Publication Data
US 2023/0321836 A1   Oct. 12, 2023

(30) Foreign Application Priority Data

Apr. 7, 2022   (JP) ................................ 2022-063883

(51) Int. Cl.
   *B25J 9/16*   (2006.01)
(52) U.S. Cl.
   CPC ........... *B25J 9/1692* (2013.01); *B25J 9/1653* (2013.01)
(58) Field of Classification Search
   None
   See application file for complete search history.

(56) References Cited

U.S. PATENT DOCUMENTS

| 10,569,418 | B2 | 2/2020 | Murata | |
| 2013/0343640 | A1* | 12/2013 | Buehler | B25J 9/163 |
| | | | | 382/155 |
| 2017/0036354 | A1* | 2/2017 | Chavan Dafle | B25J 15/0253 |
| 2018/0193999 | A1* | 7/2018 | Jacobsen | B25J 9/1633 |
| 2019/0176348 | A1* | 6/2019 | Bingham | B25J 9/1612 |
| 2019/0337152 | A1* | 11/2019 | Homberg | B25J 9/1697 |

FOREIGN PATENT DOCUMENTS

JP   6568172 B2   8/2019

OTHER PUBLICATIONS

Yamaguchi et al., Proposal of position error compensation method that enables immediate work when replacing industrial robots, 2021, IEEE, p. 342-345 (Year: 2021).*

(Continued)

*Primary Examiner* — McDieunel Marc
(74) *Attorney, Agent, or Firm* — Procopio, Cory, Hargreaves & Savitch LLP

(57) ABSTRACT

A correction device includes: a measurement point generation unit configured to generate a plurality of candidate points corresponding to posture of a robot within a movable range of the robot based on robot mechanism model information representing a mechanism of the robot and end effector information concerning an end effector installed in the robot, and determine, among the generated plurality of candidate points, a candidate point at which joint torque $\tau$ of each joint of the robot in the posture corresponding to each candidate point is equal to or more than a predetermined threshold as a measurement point; and a parameter identification unit configured to calculate a position error between a calculated position and a measured position of the end effector in the posture corresponding to the measurement point and identify mechanism error parameters so that the calculated position error is minimized.

8 Claims, 8 Drawing Sheets

(56) References Cited

OTHER PUBLICATIONS

Matsubara et al., Improvement in Measurement Area of 3D LiDAR for a Mobile Robot Using a Mirror Mounted on a Manipulator, 2020, IEEE, p. 6350-6356 (Year: 2020).*
Lu et al., Motion Transfer Control From Walking to Brachiation Through Vertical Ladder Climbing for a Multi-Locomotion Robot, 2013, IEEE, p. 1681-1693 (Year: 2013).*
Yoshitsugu et al., Machine-learning-based approach to improve the positioning accuracy of large industrial robots, 2020, IEEE, p. 323-328 (Year: 2020).*

* cited by examiner

| JOINT No. | PARAMETER | | | | MASS |
|---|---|---|---|---|---|
| | $\alpha$ | a | $\theta$ | d | |
| 1 | 0 | 0 | 0 | 400 | 100 |
| 2 | −90 | 0 | −90 | 0 | 120 |
| ⋮ | ⋮ | ⋮ | ⋮ | ⋮ | ⋮ |

222

| MASS | CENTER OF GRAVITY | | |
|---|---|---|---|
| | x | y | z |
| 100 | 400 | 300 | 50 |

224

| ID | $\theta$ (J1) | $\tau$ (J1) | JOINT DEFLECTION $c\tau$(J1) | BACKLASH $\omega$(J1) | ⋯ | $\theta$ (Jn) | $\tau$ (Jn) | JOINT DEFLECTION $c\tau$(Jn) | BACKLASH $\omega$(Jn) |
|---|---|---|---|---|---|---|---|---|---|
| 0 | 0 | 400 | 4 | 0.1 | ⋯ | 3.3 | −30 | −6 | −0.4 |
| 1 | 0.1 | 300 | 3 | 0.1 | ⋯ | 3.3 | −50 | −10 | −0.4 |
| 2 | 0.2 | −250 | −2.5 | −0.1 | ⋯ | 3.3 | −15 | −3 | −0.4 |
| ⋮ | ⋮ | ⋮ | ⋮ | ⋮ | ⋮ | ⋮ | ⋮ | ⋮ | ⋮ |

225

| JOINT No. | MECHANISM ERROR PARAMETER | | | | | |
|---|---|---|---|---|---|---|
| | $\Delta\alpha$ | $\Delta a$ | $\Delta\theta$ | $\Delta d$ | c | $\omega$ |
| 1 | 0.1 | 0.001 | 0.5 | 0.002 | 0.15 | 0.1 |
| 2 | 0.5 | 0.002 | −0.3 | −0.001 | 0.11 | 0.3 |
| ⋮ | ⋮ | ⋮ | ⋮ | ⋮ | ⋮ | ⋮ |

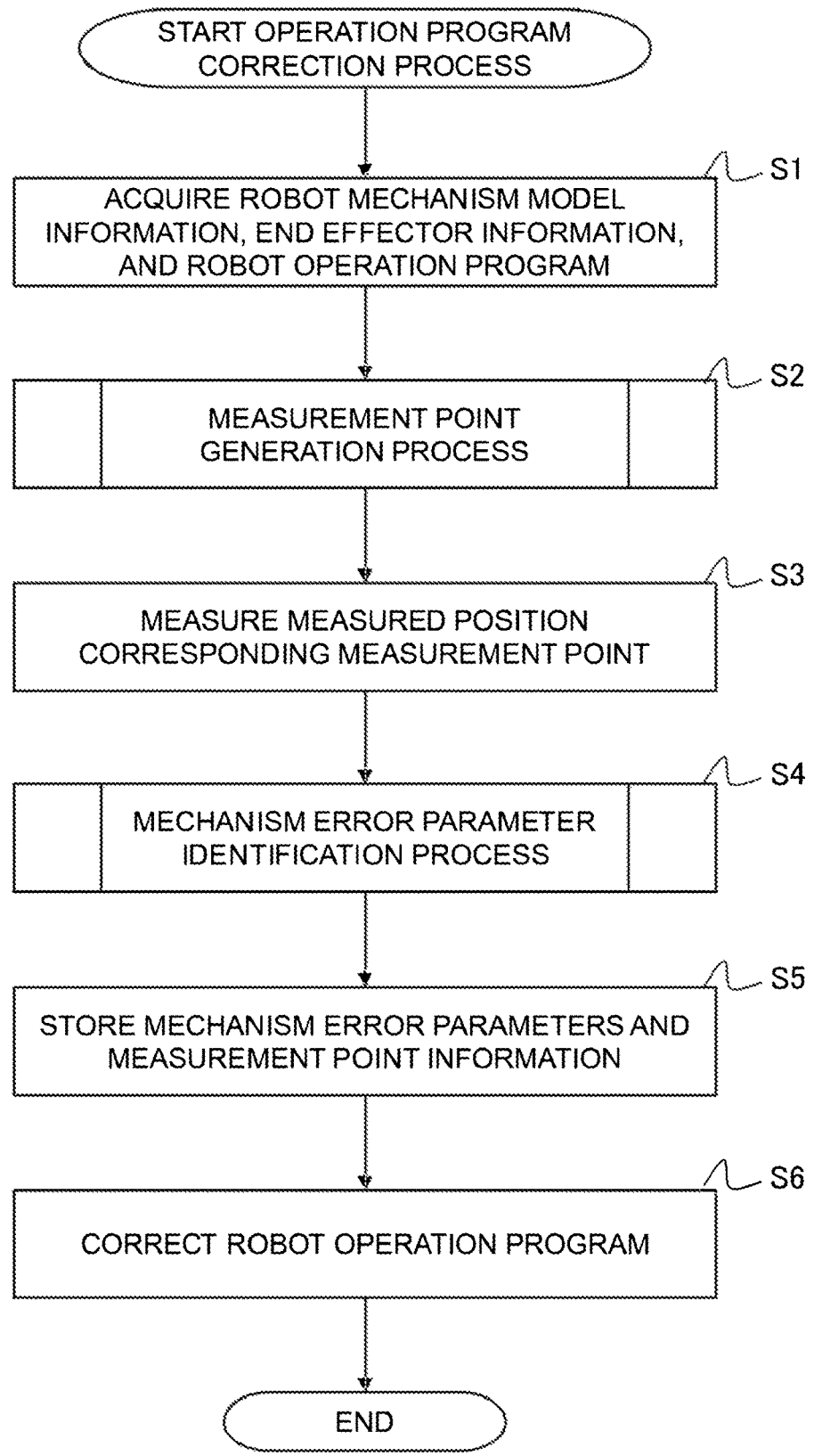

CORRECTION DEVICE, CORRECTION METHOD, AND ROBOT SYSTEM

BACKGROUND

Technical Field

The present invention relates to a correction device, a correction method, and a robot system.

Related Art

When controlling a robot, calibration is required to correct the position error between the target position commanded to the robot and the measured position when the robot is operated according to the command.

For example, Japanese Patent No. 6568172 describes a technique for calibrating a robot, in which a first measurement area and a second measurement area are set within a movable range of a robot; calibration is executed in each of the first measurement area and the second measurement area to identify mechanism error parameters; and when the robot is operated according to an operation program, the operation program is corrected by applying to each of the teaching points in the operation program the mechanism error parameters identified by calibration in the measurement area closest to each teaching point.

SUMMARY

Known factors causing position errors between the target and measured positions of the robot include robot mechanism errors, machining and assembly errors of the end effector, installation errors of the jig that fixes the workpiece, and machining and assembly errors of the workpiece. Among them, the influence of the mechanism errors of the robot is the most significant. Mechanism error parameters that contribute to robot mechanism errors include link length errors, link assembly errors, and angle errors such as joint deflection, angle offset errors, and backlash.

Among the joint deflection, angle offset errors, and backlash as angle errors, joint deflection and backlash depend on the direction of joint torque. For this reason, in the prior art such as the technique described in Japanese Patent No. 6568172, it is difficult to discriminate and identify joint deflection and backlash. The inability to discriminate and identify joint deflection and backlash is one of the reasons for the poor accuracy of calibration.

The present invention has been made in view of the above points, and an object of the present invention is to improve the accuracy of calibration by making it possible to discriminate and identify joint deflection and backlash as the angle errors included in the mechanism error parameters.

The present application includes a plurality of means of solving at least some of the above problems, and examples of which are as follows.

In order to solve the above problem, a correction device according to an aspect of the present invention includes: a measurement point generation unit configured to generate a plurality of candidate points corresponding to posture of a robot within a movable range of the robot based on robot mechanism model information representing a mechanism of the robot and end effector information concerning an end effector installed in the robot, and determine, among the generated plurality of candidate points, a candidate point at which joint torque $\tau$ of each joint of the robot in the posture corresponding to each candidate point is equal to or more than a predetermined threshold as a measurement point; and a parameter identification unit configured to calculate a position error between a calculated position and a measured position of the end effector in the posture corresponding to the measurement point and identify mechanism error parameters so that the calculated position error is minimized.

The present invention makes it possible to discriminate and identify joint deflection and backlash as the angle errors included in the mechanism error parameters, thereby improving the accuracy of calibration.

Problems, configurations, and effects other than those described above will be clarified by the following description of embodiments.

BRIEF DESCRIPTION OF DRAWINGS

FIG. 2 is a diagram showing an example of information stored in a storage unit;

FIG. 3 is a diagram for describing an example of operation program correction process;

DETAILED DESCRIPTION

Figure 1:
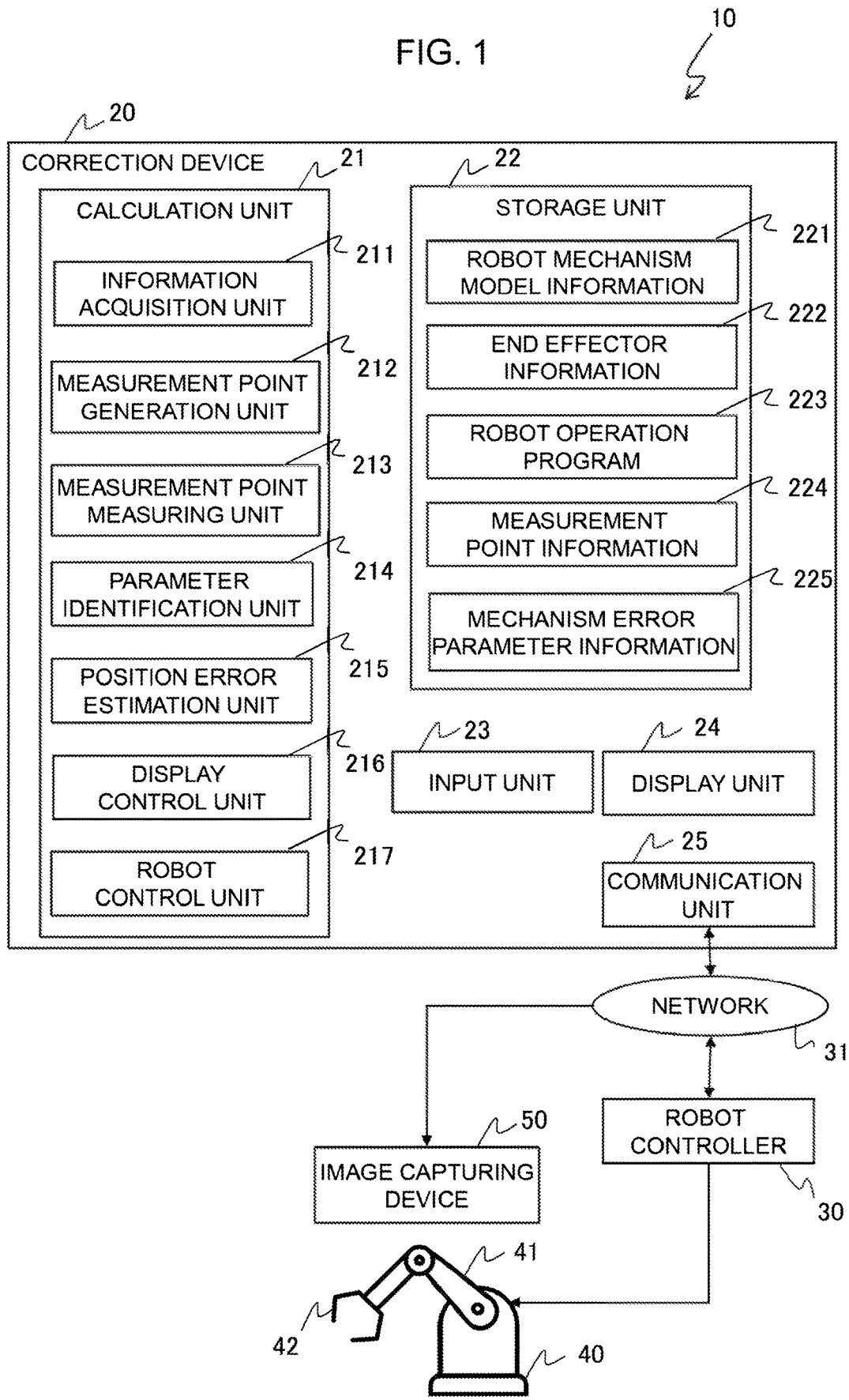
FIG. 1 is a diagram showing a configuration example of a robot system according to an embodiment of the present invention.

Hereinafter, an embodiment of the present invention will be described with reference to the drawings. In all the drawings illustrating the embodiments, the same members are denoted by the same reference numerals in principle, and repeated description thereof will be omitted. In the following embodiments, the components (including elemental steps and the like) are not necessarily essential, except when specifically indicated or when clearly considered essential in principle. In addition, when the terms "composed of A", "consisting of A", "having A", and "including A" are used, other elements are not excluded, except when, for example, it is specifically stated that it is only that element. Similarly, in the following embodiments, when reference is made to the shape, positional relationship, and the like of the components and the like, it includes those that substantially approximate or resemble the shape and the like, except when specifically indicated or when it is clearly considered that this is not the case in principle.

<Configuration Example of Robot System 10 According to Embodiment of Present Invention>

FIG. 1 is a diagram showing a configuration example of a robot system 10 according to an embodiment of the present invention.

The robot system 10 includes a correction device 20, a robot controller 30, a robot 40, and an image capturing device 50.

The correction device 20 identifies the mechanism error parameters of the robot 40. The correction device 20 corrects a robot operation program 223 using the identified mechanism error parameters.

The robot controller 30 is connected to the correction device 20 via a network 31. The robot controller 30 controls the operation of the robot 40 according to the robot operation program 223 corrected by the correction device 20.

The image capturing device 50 is connected to the correction device 20 via the network 31. The image capturing device 50 captures images of the entire robot 40 including the end effector 42 in accordance with control from the correction device 20.

The correction device 20 includes a general computer such as a personal computer including a processor such as a central processing unit (CPU), a memory such as a static random access memory (SDRAM), a storage such as a hard disk drive (HDD) or a solid state drive (SSD), a communication module, an input device, and a display device.

The correction device 20 includes a calculation unit 21, a storage unit 22, an input unit 23, a display unit 24, and a communication unit 25.

The calculation unit 21 is realized by a computer processor. The calculation unit 21 has the following functional blocks: an information acquisition unit 211, a measurement point generation unit 212, a measurement point measuring unit 213, a parameter identification unit 214, a position error estimation unit 215, a display control unit 216, and a robot control unit 217. These functional blocks are realized by a computer processor executing a predetermined program.

The information acquisition unit 211 acquires the robot mechanism model information 221, the end effector information 222, and the robot operation program 223 input from the user using the input unit 23, and stores them in the storage unit 22.

The measurement point generation unit 212 generates a plurality of measurement points representing the posture of the robot 40 within the movable range of the robot 40, which are necessary to calculate the mechanism error parameters of the robot 40, based on the robot mechanism model information 221 and the end effector information 222. The method of generating measurement points is described later.

The measurement point measuring unit 213 measures the actual position of the end effector 42 (hereinafter referred to as "measured position") when the robot 40 is in the posture corresponding to each measurement point, based on images captured by the image capturing device 50. The measurement point measuring unit 213 may be omitted, and the measured position may be measured manually.

The parameter identification unit 214 calculates the calculated position of the end effector 42 (hereinafter referred to as the calculated position) when the robot 40 is in the posture corresponding to each measurement point. The parameter identification unit 214 also calculates the position error between the calculated and measured positions corresponding to each measurement point. Furthermore, the parameter identification unit 214 identifies the mechanism error parameter that minimizes the position error corresponding to each measurement point using, for example, a nonlinear least-squares method.

The position error estimation unit 215 analyzes the trajectory information contained in the robot operation program 223 to specify the target position of the end effector 42. Based on the mechanism error parameter information 225, the position error estimation unit 215 estimates the position error between the target position of the end effector 42 and the position when the end effector 42 is actually operated. Furthermore, the position error estimation unit 215 corrects the trajectory information contained in the robot operation program 223 by correcting the target position based on the estimated position error.

The display control unit 216 displays the input/output screen 500 (FIG. 8) on the display unit 24. The robot control unit 217 reads the corrected robot operation program 223 from the storage unit 22. Furthermore, the robot control unit 217 outputs the read corrected robot operation program 223 to the robot controller 30 via the communication unit 25 and the network 31.

The storage unit 22 is realized by a computer memory and storage. The storage unit 22 stores the robot mechanism model information 221, the end effector information 222, and the robot operation program 223 input by the user. The storage unit 22 also stores the measurement point information 224 and the mechanism error parameter information 225 input from the calculation unit 21.

The input unit 23 is realized by a computer input device. The input unit 23 accepts various input operations from the user.

The display unit 24 is realized by a computer display device. The display unit 24 displays, for example, an input/output screen 500 and other screens on which the user makes various inputs and display the identified mechanism error parameters.

The communication unit 25 is realized by a computer communication module. The communication unit 25 connects to the robot controller 30 via the network 31 such as the Internet or a cellular phone communication network to communicate various data.

The robot 40 is an articulated robot. The robot 40 has the end effector 42 at the end of the arm 41. The robot 40 performs predetermined operations and tasks according to control from the robot controller 30.

<Mechanism Error Parameter>

Next section describes the mechanism error parameters of the robot 40. The posture of the robot 40 can be expressed by the following formula (1) indicating the position of each joint.

[Mathematical Formula 1]

$$P_{k,i+1} = R_{\alpha_i,\theta_{k,i}}(L_i^* + \Delta L_i) + P_{k,i}$$

$$\alpha_i = \alpha_i^* + \Delta \alpha_i$$

$$\theta_{k,i} = \theta_{k,i}^* + c_i \tau_{k,i} + \Delta \theta_i + \omega_i \quad (1)$$

Here, $P_{k,i+1}$ indicates the position of the i+1-th joint in the stationary state when the robot 40 is operated to be in the posture corresponding to the measurement point k. R is a known rotation matrix that acts on the i-th link length L (not illustrated) connecting the i-th joint and the i+1-th joint. The link length L can include a link length error $\Delta L_i$ with respect to the link length (known design value) $L^*$. The assembly angle (known design value) $\alpha_i$ for assembling the i-th link for the i-th joint can include an assembly error $\Delta \alpha_i$ with respect to the assembly angle $\alpha^*$. The joint angle $\theta_{k,i}$ of the i-th joint corresponding to the measurement point k can include the joint deflection $c_i \tau_{k,i}$, the angle offset error Dei, and the backlash $\omega_i$ with respect to the joint angle (known command value) $\theta^*$.

Hereinafter, the link length error $\Delta L_i$, the assembly error $\Delta \alpha_i$, the joint deflection $c_i \tau_{k,i}$, the angle offset error $\Delta \theta_i$, and the backlash $\omega_i$ are referred to as mechanism error parameters. In addition, the joint deflection $c_i \tau_{k,i}$, the angle offset error $\Delta \theta_i$, and the backlash $\omega_i$ are collectively referred to as an angle error.

<About Various Information>

FIG. 2 illustrates an example of the robot mechanism model information 221, the end effector information 222, the measurement point information 224, and the mechanism error parameter information 225 stored in the storage unit 22.

In the robot mechanism model information 221, the robot 40 is denoted as a Denavit-Hartenberg (DH) model. In the robot mechanism model information 221, the assembly angle α, joint angle θ, a and d representing the link length L, and mass are recorded in association with each joint axis.

In the end effector information 222, the mass and barycentric coordinate of the end effector 42 are recorded.

In the measurement point information 224, the joint angle θ, the joint torque τ, the joint deflection cτ, and the backlash ω of each joint from the first to the n-th are recorded in association with the ID of the measurement point.

In the mechanism error parameter information 225, Δa and Δd representing the link length error ΔL, the assembly error Δα, the angle offset error Δθ, the coefficient c of joint deflection cτ, and the backlash ω are recorded in association with each joint.

<Operation Program Correction Process by Correction Device 20>

FIG. 3 is a flowchart illustrating an example of the operation program correction process by the correction device 20.

Figure 8:
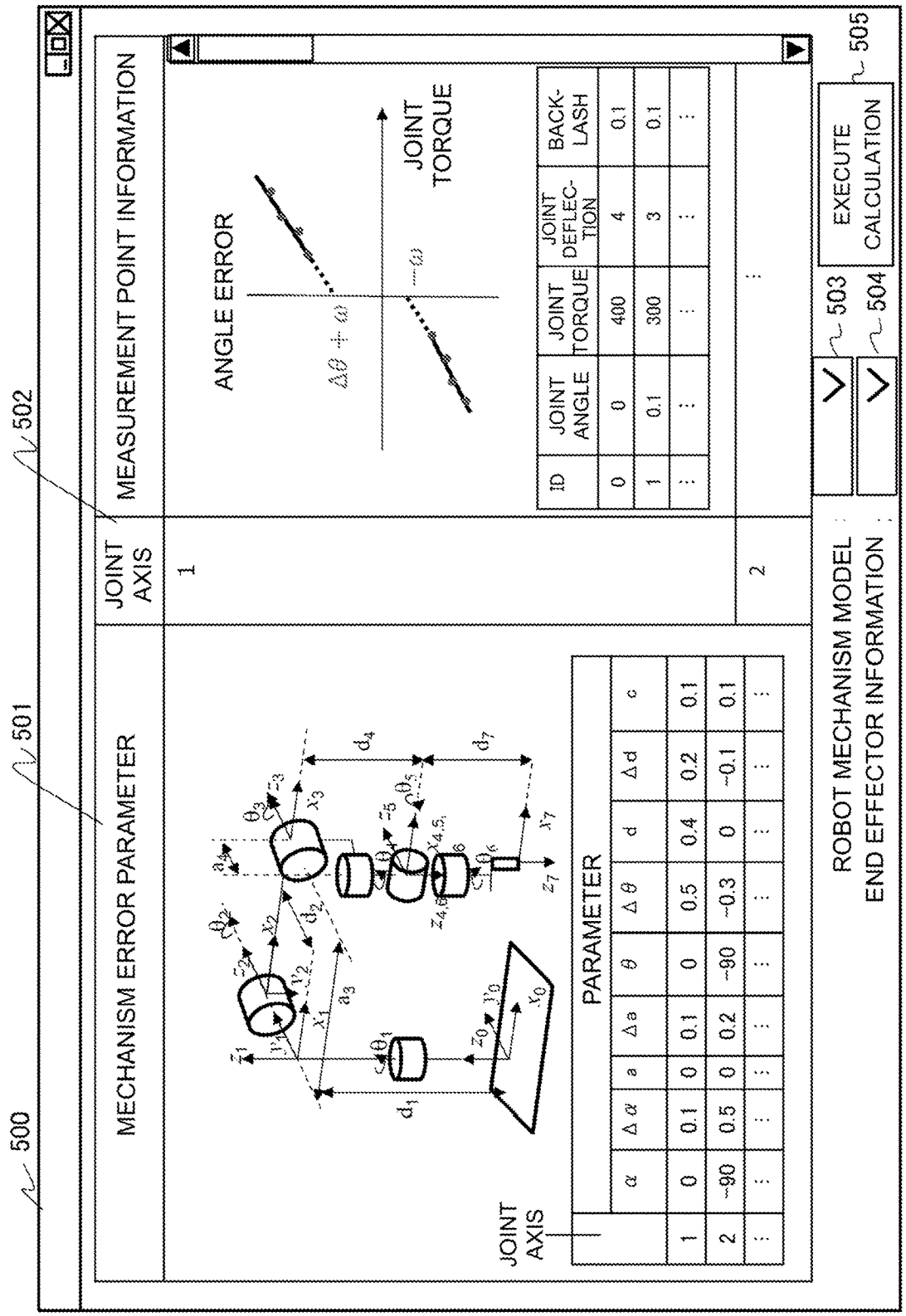
FIG. 8 is a diagram illustrating a display example of an input/output screen.

The operation program correction process is started, for example, in response to user operation of a calculation execution button 505 on the input/output screen 500 (FIG. 8).

First, the information acquisition unit 211 acquires the robot mechanism model information 221, the end effector information 222, and the robot operation program 223, which are input by the user using the input unit 23, and stores them in the storage unit 22 (step S1).

Next, the measurement point generation unit 212 executes the measurement point generation process (step S2).

Figure 4:
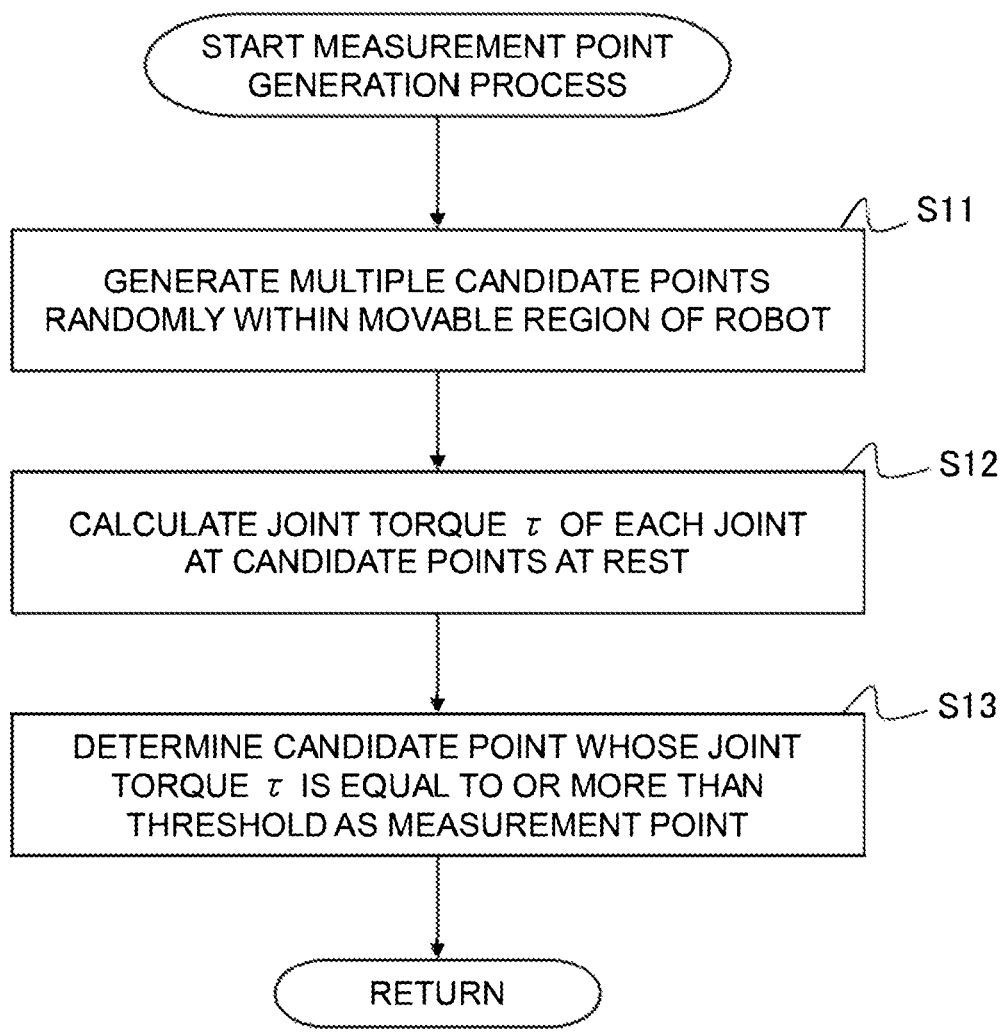
FIG. 4 is a flowchart illustrating an example of a measurement point generation process.
Figure 5:
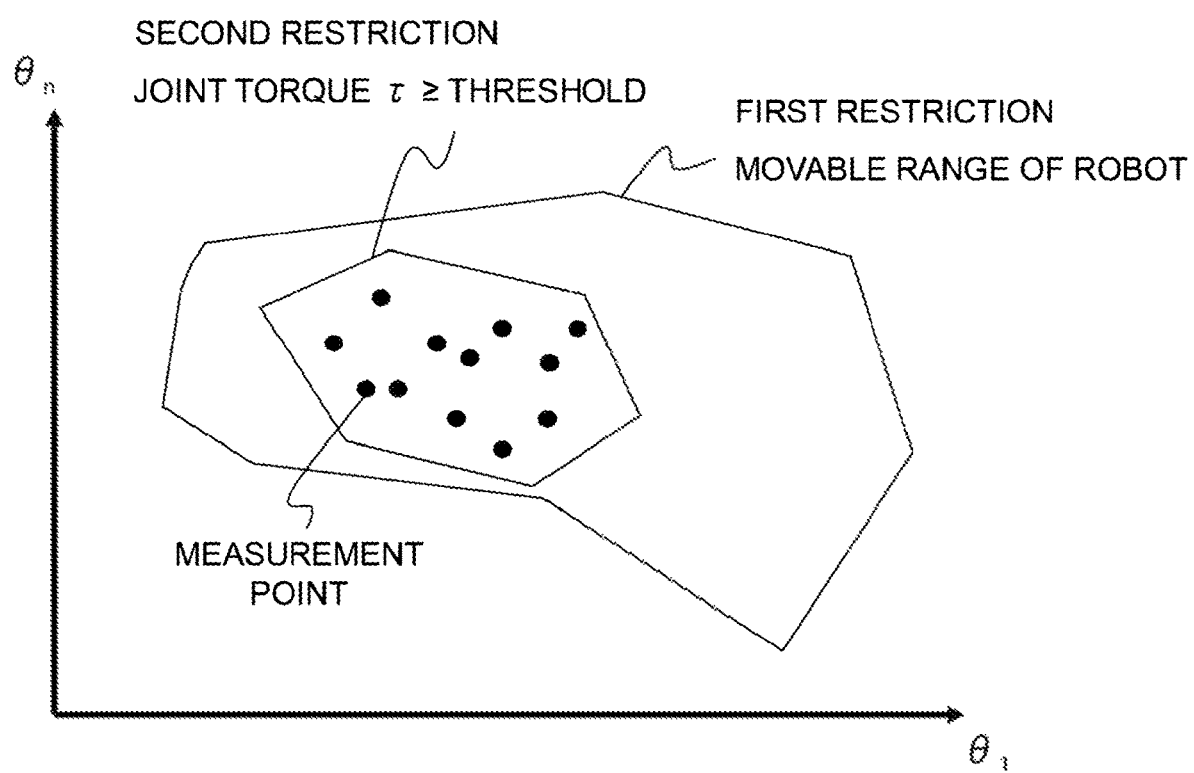
FIG. 5 is a diagram illustrating the measurement point generation process.

FIG. 4 is a flowchart illustrating an example of the measurement point generation process. FIG. 5 is a diagram for describing the measurement point generation process, and represents a theoretical n-dimensional space with the joint angles $\theta_1$ to $\theta_n$ of each joint constituting the robot 40 as coordinate axes.

First, as a first restriction, the measurement point generation unit 212 specifies the inside of the movable region of the robot 40 based on the robot mechanism model information 221, and randomly generates a plurality of candidate points within the movable region (step S11).

Next, the measurement point generation unit 212 specifies the joint angle θ at each joint with the robot 40 in the posture corresponding to each candidate point. The measurement point generation unit 212 also refers to the robot mechanism model information 221 and the end effector information 222, and calculates the joint torque τ at rest in that state for each joint using the mass of the arm 41 on the end effector 42 side from that joint and the mass of the end effector, and the distance from that joint to the center of gravity of the arm 41 and the end effector 42 (step S12).

Next, as a second restriction, the measurement point generation unit 212 determines, among the plurality of candidate points, the candidate point for which the joint torque τ at each joint of the robot 40 is equal to or more than the threshold as a measurement point. Appropriate threshold values should be set for each joint. Then, the measurement point generation unit 212 records the joint angle θ and the joint torque τ at each joint in the measurement point information 224 in the storage unit 22 in association with the ID for identifying each measurement point (step S13). This completes the measurement point generation process.

The measurement point generation process can generate measurement points corresponding to postures where joint deflection in the angle error is dominant and the backlash can be ignored.

Now back to FIG. 3. Next, the measurement point measuring unit 213 measures the measured position corresponding to each of the generated measurement points (step S3).

Next, the parameter identification unit 214 executes the mechanism error parameter identification process (step S4).

Figure 6:
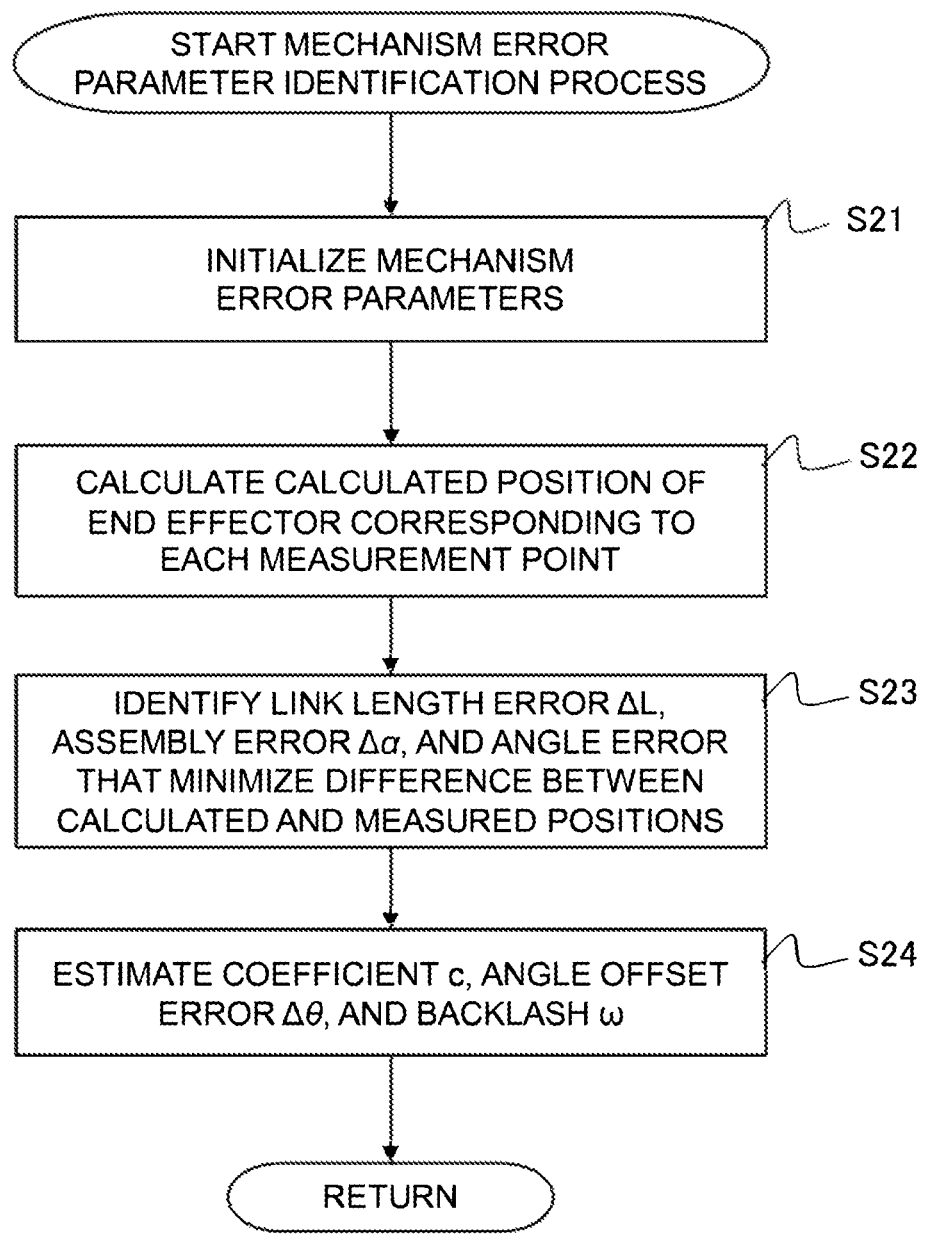
FIG. 6 is a flowchart illustrating an example of a mechanism error parameter identification process.

FIG. 6 is a flowchart illustrating an example of the mechanism error parameter identification process. First, the parameter identification unit 214 initializes the mechanism error parameter information 225 stored in the storage unit 22 (step S21). Next, the parameter identification unit 214 calculates the calculated position of the end effector 42 when the robot 40 is in the posture corresponding to each measurement point according to the following formula (2) (step S22).

[Mathematical Formula 2]

$$P_{k,i+1} = R_{\alpha_i, \theta_{k,i}}(L_i^* + \Delta L_i) + P_{k,i}$$

$$\alpha_i = \alpha_i^* + \Delta \alpha_i$$

$$\theta_{k,i} = \theta_{k,i}^* + c_i \tau_{k,i} \quad (2)$$

As described above, at the measurement point, the angle error is dominated by joint deflection. As a result, in the formula (2), compared to the formula (1), the angle offset error Dei and the backlash $\omega_i$ are omitted from the formula representing the joint angle $\theta_{k,i}$ of the i-th joint corresponding to the measurement point k.

Next, the parameter identification unit 214 calculates the position error between the calculated and measured positions corresponding to each measurement point. In addition, the parameter identification unit 214 identifies the link length error $\Delta L_i$, the assembly error $\Delta \alpha_i$, and the angle error (joint deflection cτ) at which the position error corresponding to each measurement point is minimized using, for example, the nonlinear least squares method (step S23). However, since the joint deflection in the angle error is dominant at each measurement point, the identified angle error can be regarded as the joint deflection cτ.

Next, the parameter identification unit 214 estimates the coefficient c of joint deflection cτ, the angle offset error Δθ, and the backlash ω at each joint (step S24).

Figure 7:
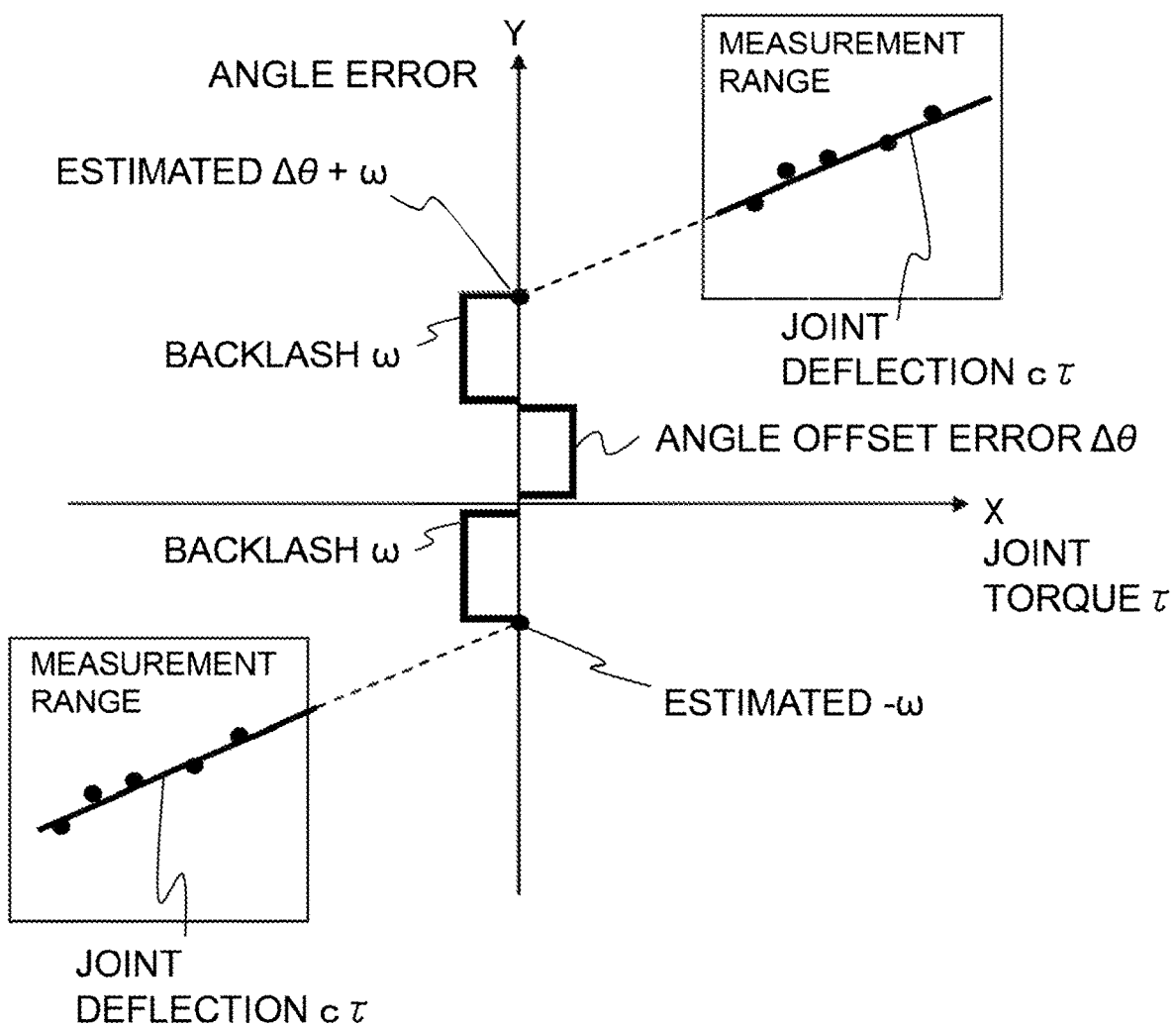
FIG. 7 is a diagram illustrating a method of estimating a coefficient of joint deflection, an angle offset error, and backlash.

FIG. 7 is a diagram illustrating the method of estimating the coefficient c, the angle offset error Δθ, and the backlash ω. In the drawing, the X-axis represents joint torque and the Y-axis represents angle error.

First, the parameter identification unit 214 plots the joint torque τ on the x-axis and the angle error (joint deflection cτ) on the y-axis for each joint in association with each measurement point, and calculates the coefficient c by estimating two straight lines representing the angle error (joint deflection cτ), which varies depending on the joint torque τ. Next, the parameter identification unit 214 calculates the first Y-intercept (angle offset error Δθ+backlash ω) of the line in the region X>0 and Y>0. The parameter identification unit 214 also calculates the second Y-intercept (−backlash ω) of the line in the region of X<0 and Y<0. Furthermore, the parameter identification unit 214 calculates the angle offset error Δθ by subtracting the absolute value of the second Y-intercept from the value of the first Y-intercept, and calculates the backlash ω by subtracting the angle offset error Δθ from the value of the first Y-intercept. This completes the mechanism error parameter identification process.

Now back to FIG. 3. Next, the parameter identification unit 214 stores the identified mechanism error parameter in the storage unit 22 as the mechanism error parameter information 225. In addition, the parameter identification unit 214 records the joint deflection cτ and the backlash ω, among the identified mechanism error parameters, in the measurement point information 224 in the storage unit 22 (step S5).

Next, the position error estimation unit 215 corrects the current robot operation program 223 stored in the storage unit 22 based on the mechanism error parameter information 225 (step S6). This completes the operation program correction process by the correction device 20.

The operation program correction process described above can discriminate and identify the joint deflection cτ and the backlash ω as the angle error included in the mechanism error parameters. This improves the accuracy of calibration.

<Display Example of Input/Output Screen 500>

Next, FIG. 8 illustrates an example of an input/output screen 500 displayed on the display unit 24 and presented to the user. The input/output screen 500 is provided with a mechanism error parameter display area 501, a measurement point information display area 502, a robot mechanism model input button 503, an end effector information input button 504, and a calculation execution button 505.

In the mechanism error parameter display area 501, the identified mechanism error parameters are displayed based on the mechanism error parameter information 225 stored in the storage unit 22. In the mechanism error parameter display area 501, a robot mechanism model representing the robot mechanism is displayed based on the robot mechanism model information 221 stored in the storage unit 22. In the measurement point information display area 502, the joint angle θ, the joint torque τ, the joint deflection cτ, and the backlash ω corresponding to each measurement point are displayed for each joint based on the measurement point information 224 stored in the storage unit 22.

The robot mechanism model input button 503 is an operation button for the user to instruct the selection and readout of the robot mechanism model information 221. The end effector information input button 504 is an operation button for the user to instruct the selection and readout of the end effector information 222. The calculation execution button 505 is an operation button for the user to instruct the start of the mechanism error parameter identification process.

On the input/output screen 500, the user can select the robot mechanism model information 221 and the end effector information 222 and instruct its readout. The user can also check the identified mechanism error parameters and the generated measurement point information.

<Modification>

Regarding the generation of measurement points by the measurement point generation unit 212, a third restriction may be added to the first and second restrictions described above. That is, as the third restriction, the measurement point generation unit 212 may analyze the robot operation program 223 and determine the candidate points that are close (distance is equal to or less than a predetermined threshold) to the teaching points that the robot 40 will pass by the end of its operation as measurement points. By adding the third restriction, the mechanism error parameter can be identified with higher accuracy.

The present invention is not limited to the above-described embodiments, and various modifications are possible. For example, the above-described embodiments have been described in detail for easy understanding of the present invention, and are not necessarily limited to those having all the described configurations. Some of the configurations of one embodiment may be replaced by or added to the configurations of other embodiments.

In addition, each of the above components, functions, processing units, processing means, and others may be realized in hardware, for example, by designing some or all of them in an integrated circuit. In addition, each of the above-described configurations, functions, and the like may be realized in software by a processor interpreting and executing a program that realizes each function. Information such as programs, tables, and files that realize each function can be placed in recording devices such as memory, hard disks, SSDs, or in recording media such as IC cards, SD cards, and DVDs. In addition, control and information lines considered necessary for illustrative purposes are illustrated here, and not all control and information lines on the product are necessarily illustrated. In practice, almost all configurations may be considered connected to each other.

What is claimed is:

1. A correction device comprising:
    a measurement point generation unit configured to generate a plurality of candidate points corresponding to posture of a robot within a movable range of the robot based on robot mechanism model information representing a mechanism of the robot and end effector information concerning an end effector installed in the robot, and determine, among the generated plurality of candidate points, a candidate point at which joint torque τ of each joint of the robot in the posture corresponding to each candidate point is equal to or more than a predetermined threshold as a measurement point; and
    a control unit configured to calculate a position error between a calculated position and a measured position of the end effector in the posture corresponding to the measurement point and identify mechanism error parameters so that the calculated position error is minimized.

2. The correction device according to claim 1, wherein the parameter identification unit is configured to
    identify a link length error ΔL, an assembly error Δα, and an angle error as the mechanism error parameters so that the calculated position error is minimized, and
    estimate a coefficient c of joint deflection cτ, an angle offset error Δθ, and a backlash ω based on the identified angle error and the joint torque τ at each joint.

3. The correction device according to claim 1, wherein the measurement point generation unit is configured to analyze a robot operation program for controlling operation of the robot and determine the candidate points within a predetermined distance from a teaching point corresponding to the robot posture until the operation corresponding to the robot operation program is completed as the measurement points.

4. The correction device according to claim 1, comprising a measurement point measuring unit configured to measure the measured position.

5. The correction device according to claim 1, comprising a position error estimation unit configured to estimate the position error of the end effector when the robot is operated according to a robot operation program for controlling operation of the robot, based on the mechanism error parameters.

6. The correction device according to claim 5, wherein the position error estimation unit corrects the robot operation program based on the estimated position error.

7. A correction method by a correction device, the correction method comprising:

a measurement point generation step of generating a plurality of candidate points corresponding to posture of a robot within a movable range of the robot based on robot mechanism model information representing a mechanism of the robot and end effector information concerning an end effector installed in the robot, and determining among the generated plurality of candidate points, a candidate point at which joint torque $\tau$ of each joint of the robot in the posture corresponding to each candidate point is equal to or more than a predetermined threshold as a measurement point; and a control step of calculating a position error between a calculated position and a measured position of the end effector in the posture corresponding to the measurement point and identifying mechanism error parameters so that the calculated position error is minimized.

8. A robot system comprising:

a robot; and a correction device configured to correct a robot operation program for controlling operation of the robot, wherein the correction device includes a measurement point generation unit configured to generate a plurality of candidate points corresponding to posture of the robot within a movable range of the robot based on robot mechanism model information representing a mechanism of the robot and end effector information concerning an end effector installed in the robot, and determine, among the generated plurality of candidate points, a candidate point at which joint torque $\tau$ of each joint of the robot in the posture corresponding to each candidate point is equal to or more than a predetermined threshold as a measurement point, a control unit configured to calculate a position error between a calculated position and a measured position of the end effector in the posture corresponding to the measurement point and identify mechanism error parameters so that the calculated position error is minimized, a position error estimation unit configured to estimate the position error of the end effector when the robot is operated according to the robot operation program based on the mechanism error parameters, and correct the robot operation program based on the estimated position error, and the robot control unit configured to control the robot based on the corrected robot operation program.

* * * * *